United States Patent
Bugenhagen et al.

(10) Patent No.: US 8,111,701 B2
(45) Date of Patent: Feb. 7, 2012

(54) SYSTEM AND METHOD FOR PRIORITIZING AND PROVIDING CREDITS FOR DATA PACKET COMMUNICATION OVER A PACKET NETWORK

(75) Inventors: Michael K. Bugenhagen, Olathe, KS (US); William L. Wiley, Overland Park, KS (US)

(73) Assignee: Embarq Holdings Company LLC, Overland Park, KS (US)

( * ) Notice: Subject to any disclaimer, the term of this patent is extended or adjusted under 35 U.S.C. 154(b) by 188 days.

(21) Appl. No.: 12/253,328

(22) Filed: Oct. 17, 2008

(65) Prior Publication Data

US 2009/0129264 A1    May 21, 2009

Related U.S. Application Data

(60) Provisional application No. 60/999,267, filed on Oct. 17, 2007.

(51) Int. Cl.
*H04L 12/28* (2006.01)

(52) U.S. Cl. .............. 370/395.42; 370/392; 709/240; 709/238

(58) Field of Classification Search .......... 370/235, 370/465, 468, 230, 232, 389, 392, 401, 352, 370/353, 412, 444, 228, 438, 400, 395.32, 370/395, 43; 709/200, 223, 238, 240
See application file for complete search history.

(56) References Cited

U.S. PATENT DOCUMENTS

| | | | | |
|---|---|---|---|---|
| 6,765,905 | B2* | 7/2004 | Gross et al. | 370/389 |
| 7,464,180 | B1* | 12/2008 | Jacobs et al. | 709/240 |
| 2002/0087393 | A1* | 7/2002 | Philonenko | 705/11 |
| 2004/0039803 | A1* | 2/2004 | Law | 709/223 |

* cited by examiner

*Primary Examiner* — Huy Vu
*Assistant Examiner* — Dady Chery
(74) *Attorney, Agent, or Firm* — Patton Boggs LLP

(57) ABSTRACT

A system and method for prioritizing data packets being communicated over a packet network may include receiving a data packet at a network node. The data packet may include an origination network address, a destination network address, and a data field. A determination may be made as to whether at least one of the origination and destination network addresses is a priority network address. The data field of the data packet may be set to a priority value if at least one of the origination and destination network addresses is determined to be a priority network address. The data field of the data packet may be set to a non-priority value if both the origination and destination network addresses are determined not to be a priority network address.

18 Claims, 4 Drawing Sheets

| FILE | EDIT | VIEW | FAVORITES | TOOLS | HELP | | |
|---|---|---|---|---|---|---|---|
| BACK | FORWARD | STOP | REFRESH | HOME | SEARCH | PRINT | 600 |

PRIORITIZE YOUR COMMUNICATIONS

ENTER PRIORITY NETWORK ADDRESS www.mywebsite.com

602

SELECT COMMON NETWORK ADDRESS

| O | www.msn.com |
|---|---|
| O | www.espn.com |
| O | www.cnn.com |
| O | www.netflix.com |

604

PRIORITY NETWORK ADDRESSES

| www.mywebsite.com | 07.141.966.41 |
|---|---|
| www.cnn.com | 04.927.384.21 |
| www.netflix.com | 72.744.384.83 |
| www.gamesite.com | 81.472.011.31 |

606

PURCHASE PRIORITY CREDITS

CREDITS

| 500 MINS | ▽ |
|---|---|
| 1000 MINS | |

608

CURRENT BALANCE

472 MINS

SYSTEM AND METHOD FOR PRIORITIZING AND PROVIDING CREDITS FOR DATA PACKET COMMUNICATION OVER A PACKET NETWORK

CROSS REFERENCE TO RELATED APPLICATIONS

This Application claims priority to Provisional Patent Application Ser. No. 60/999,267 filed on Oct. 17, 2007; the entire teachings of which are incorporated herein by reference.

BACKGROUND

Communicating data packets over packet networks has revolutionized both data and voice communications. As Internet and Ethernet networks have grown, so too has communications traffic. There is a limited amount of bandwidth over packet networks. To ensure that there is sufficient bandwidth for those attempting to communicate over the Internet and Ethernet networks, service providers allocate a certain amount of bandwidth for each customer. Customers can pay for different amounts of bandwidth. However, service provider contracts generally only provide for "best efforts" to ensure that each customer receives the allocated bandwidth, customers do not always receive the bandwidth they expect during times of high traffic.

Because certain applications, such as real-time telephony communications or credit card transactions, demand high quality of service, priority may be given to these applications. One way that priority is given to these applications is by setting a data field within a data packet header. One data field that is typically used for priority marking is a differentiated services or "diffserv" data field within the data packet header. In Ethernet environments, a priority field or "p-bit" data field may be set with a priority value. It is generally understood that setting the diffserv data field to a priority value is supposed to give a data packet some level of priority. The reality is that even with the priority value in the diffserv data field in a data packet header, service providers generally ignore these markings since a majority of data packets have the diffserv data field marked for priority, thereby making most data packets a priority, which, of course, makes few data packets any more of a priority than any other data packet with a priority value in a priority data field (e.g., diffserv data field). And, given that the best assurance that a service provider offers and obligated to provide both customers and other service providers is "best efforts" for quality of service, there is little, if any, recourse that a customer, network partner or other service provider can do if their priority data packets do not receive priority.

SUMMARY

To overcome the problem of so many data packets being marked as priority such that priority has little, if any, meaning and causing service providers to ignore priority of data packets and to limit their priority services to "best efforts," the principles of the present invention provide for data packets being communicated over a packet network to be marked as a priority data packet by determining that the data packet is being communicated to or from a network address that is stored in a database as a priority network address and, in response to determining that the data packet is a priority data packet, setting a data field in a header of the priority data packet. In addition, the principles of the present invention may reset the data field to a non-priority value, such as zero, if the data packet is not considered a priority. In one embodiment, the data field is a 'diffserv' data field in a header of the data packet. By resetting priority data fields of data packets that are not a priority, the service provider can ensure that priority data packets as determined by the packet network can be guaranteed to be prioritized, thereby achieving a higher level of "best efforts," such that true guarantees can be provided by the service provider to its customers and network partners.

In addition, because the service provider may be able to guarantee its customers and network partners of priority communication services, the principles of the present invention provide for priority credits or "tokens" to be purchased. The priority credits may represent time (e.g., 300 minutes per month), data volume (e.g., 50 MB per month), or any other unit of measure to provide a customer or network partner with a guaranteed quality of service (QoS). In one embodiment, such a purchase may be made over a website. In addition to purchasing units of measure (e.g., time) that a certain QoS level is to be provided, the customers and network partners may identify network addresses that are to be treated as their priority network addresses such that communications, all or certain types of communications, with the priority network addresses are prioritized for at least a unit of measure of which the customer or network partner has a remaining balance of priority credits.

One embodiment of a method for prioritizing data packets being communicated over a packet network may include receiving a data packet at a network node. The data packet may include an origination network address, a destination network address, and a data field. A determination may be made as to whether at least one of the origination and destination network addresses is a priority network address. The data field of the data packet may be set to a priority value if at least one of the origination and destination network addresses is determined to be a priority network address. The data field of the data packet may be set to a non-priority value if both the origination and destination network addresses are determined not to be a priority network address.

Another method for prioritizing data packets being communicated over a packet network may include receiving a data packet at a network node. The data packet may include an origination network address and destination network address. A determination as to whether at least one of the origination and destination network addresses is a priority network address. In response to determining that at least one of the origination and destination network addresses is a priority network address, a determination as to whether at least one of the sender and receiver has priority credit available for priority communication of the data packet. In response to determining that at least one of the sender and receiver of the data packet is associated with a priority network address and has priority credit available for priority communication of the data packet, the data packet may be communicated in a prioritized manner.

One embodiment of a network node for prioritizing data packets being communicated over a packet network may include an input/output unit configured to communicate data packets over a packet network and a computing unit. The computing unit may be configured to receive a data packet including an origination network address, destination network address, and data field. The computing unit may further be configured to determine whether at least one of the origination and destination network addresses is a priority network address and set the data field of the data packet to a priority value if at least one of the origination and destination network addresses is determined to be a priority network address. The computing unit may further be configured to set the data field of the data packet to a non-priority value if both the origination and destination network addresses are determined not to be a priority network addresses, and communicate the data packet with the data field being set to a priority value or non-priority value via said I/O unit over the packet network to the destination network address.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 6 is a screen shot of an exemplary website that enables a subscriber or network partner to identify priority network addresses.

DETAILED DESCRIPTION OF DRAWINGS

Figure 1:
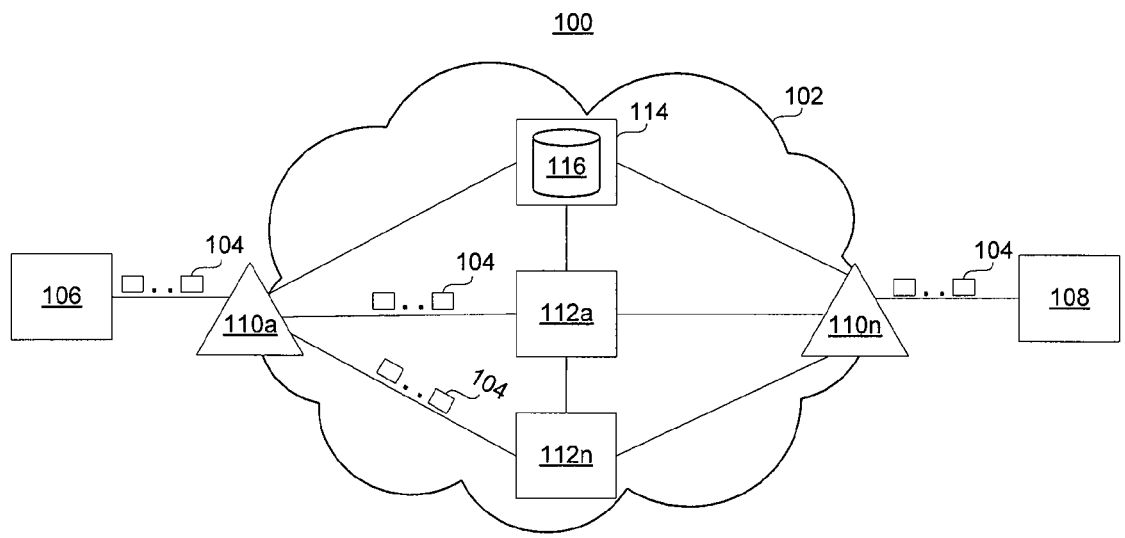
FIG. 1 is a block diagram of an exemplary communications system in which priority data packet communications may be employed in accordance with the principles of the present invention.

FIG. 1 is a block diagram of an exemplary communications system 100 in which priority data packet communications may be employed in accordance with the principles of the present invention. The communications system may include a packet network 102 that is used to communicate data packets 104 between communications devices 106 and 108. In one embodiment, the communications devices 106 and 108 are used by subscribers of a service provider that manages the packet network 102. Alternatively, the communications devices may be network nodes of network partners of the service provider. The subscribers and network partners of the service provider may be consumer, commercial, or governmental subscribers.

The packet network 102 may include media gateway devices 110a-110n (collectively 110) that are located at an "edge" of the packet network 102 and used to communicate data packets 104 between the communications devices 106 and 108. As understood in the art, the media gateways 110 may translate communications protocols between different networks. In addition, the media gateways 110 may execute software that operates to receive data packets 104 and determine whether a sender and/or receiver of the data packets 104 have requested priority for data packets to be communicated over the packet network 102. In determining whether priority has been requested, the media gateways 110 may look up priority network addresses at a local database, at a central database, or a combination thereof. It should be understood that the media gateway devices 110 are exemplary and that other network nodes may alternatively be used for determining and setting prioritization.

Figure 2:
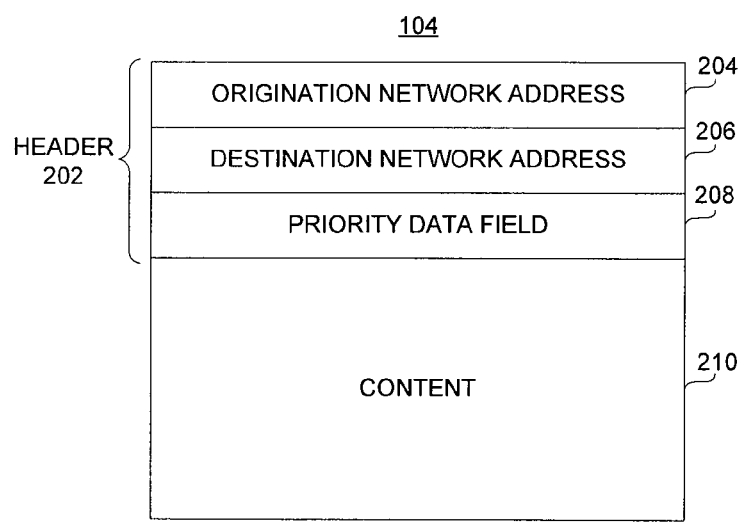
FIG. 2 is a block diagram of an exemplary data packet showing data fields contained therein.

FIG. 2 is a block diagram of an exemplary data packet 104 showing data fields contained therein. The data packet 104 includes a header 202 including three data fields, including an origination network address data field 204, destination network address data field 206, and priority data field 208. It should be understood that the data packet header 202 may include many other data fields, but these are ones that are primarily of interest in prioritizing data packets during communications in accordance with the principles of the present invention. The origination and destination network address data fields 204 and 206 may include network addresses that are Internet protocol (IP) addresses associated with a sending device and receiving device, such as a personal computer and server hosting a website. Other network addresses as understood in the art may also be utilized. The IP addresses may be determined by a domain name server (DNS) and included in the data packet 104. The priority data field 208 may be a data field having one or more data bits (e.g., 8 data bits) that are used to determine whether the data packet is to be set to having priority. A content data field 210 may include data that is being communicated in the data packet. The content may include real-time content (e.g., telephone call) or non-real-time content (e.g., movie download).

Continuing with FIG. 1, the packet network 102 may include network nodes 112a-112n (collectively 112) that are used to provide communication paths over the packet network 102. The network nodes 112 may be routers, servers, or any other network node, as understood in the art. A centralized network node 114 may be configured as a call server or any other management server to coordinate media gateways 110 and network nodes 112. The centralized network node 114 may include or otherwise be in communication with a storage unit 116 that stores a database of priority network addresses. The database of priority network addresses may include network addresses with which a user or operator of the network addresses requests priority of data packets being communicated. For example, a subscriber may desire to have priority when communicating over the packet network 102, so pays extra to have priority of communications over other subscribers. As another example, a website may desire to have priority for its customers, so the owner of the website may pay extra to the service provider to enable customer communications with the website to use priority data packet communications. And, if the website owner pays for priority, its customers may receive priority communications without having to pay for priority.

Figure 3:
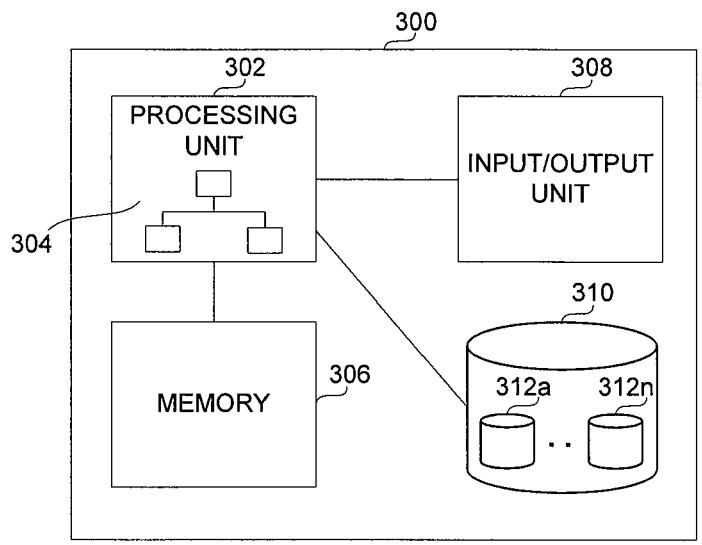
FIG. 3 is a block diagram of an exemplary network node that operates on a packet network and may be used for prioritizing data packets being communicated thereon.

FIG. 3 is a block diagram of an exemplary network node 300 that operates on a packet network and may be used for prioritizing data packets being communicated thereon. The network node 300 may include a processing unit 302 that includes one or more processors to execute software 304. The processing unit 302 may further be in communication with a memory 306, input/output (I/O) unit 308, and storage unit 310. The storage unit 310 may store one or more databases 312a-312n (collectively 312) to store network information, such as network addresses that have priority ("priority network addresses"). The memory 306 may be used to cache priority network addresses that have recently been used to expedite lookup of the priority network addresses. The I/O unit 308 may be configured to communicate with other network nodes and non-network nodes (e.g., personal communications devices). In one embodiment, the processor 302 may request priority network addresses from a remote network node, such as centralized network node, that operates a database of priority network addresses.

The software 304 may be configured to receive data packets and determine whether an origination and/or destination network address is a priority network address and, if one of the network addresses is a priority network address, set a priority data field to have a priority value. Otherwise, if neither network address is a priority network address, then the software 304 may be configured to set the priority data field to a non-priority value, such as zero. Still yet, if one network address is established as a priority but not with the other, then a non-priority value may be set in the priority data field. By setting the priority data field to both priority and non-priority values, network nodes on the packet network 102 (FIG. 1) operated by a service provider can be certain that the data packets are to be prioritized and priority values established by other network service providers for other purposes may not be acted upon. That is, the service provider of the packet network may guarantee a customer or network partner a minimum quality of service level as each data packet can positively be identified as being prioritized.

TABLE I is an exemplary list of network addresses that are priority network addresses. As shown, the list may optionally include two fields that may be used to determine whether data packets are to be prioritized when communicated to or from the network address. A network node that looks up the origination and destination network addresses may simply determine that one or both of the network addresses are priority network addresses and set a priority value in the priority data field of the data packet header. In the event that the origination and destination network addresses are not priority network addresses, the priority data field is set to a non-priority value. Alternatively, a determination may be made as to whether a network address is to transmit and/or receive data packets with priority and, depending upon whether the network address is transmitting or receiving the data packet, set the priority value accordingly. For example, if a data packet is being communicated from network address 07.141.966.41, that data packet would not be prioritized. However, if the data packet is being communicated to network address 07.141.966.41, that data packet is prioritized.

In addition to determining whether a network address is a priority network address, the principles of the present invention may also provide for priority credits or "tokens" to be purchased by subscribers or network partners. A customer of a network service provider may purchase a certain number of minutes (e.g., $20 per 500 minutes of priority minutes), blocks of minutes (e.g., $20 per 50 blocks of minutes), or data blocks (e.g., $20 per 100 MB). Additionally, an unlimited number of minutes of priority may be purchased (e.g., $100 per month). A network partner of a network service provider may purchase or receive credit for large blocks of priority minutes (e.g., 500,000 minutes) or other unit of measure (e.g., 500 GB) and account for a difference in priority minutes or other units used by each of the network service providers of each other's networks at the end of a time period (e.g., each month). Although described in minutes and data volume, different units, such as erlangs, may be utilized as a unit of measure, as understood in the art.

TABLE I

| Network Address | Packets To | Packets From | Priority Credits |
| --- | --- | --- | --- |
| 66.230.188.82 | No | Yes | 493 |
| 98.747.143.02 | No | Yes | 279 |
| 14.983.173.42 | Yes | Yes | 414,472 |
| 07.141.966.41 | Yes | No | Unlimited |
| 78.372.472.55 | No | Yes | 75 |
| 08.141.966.41 | Yes | Yes | 322,986 |

Figure 4:
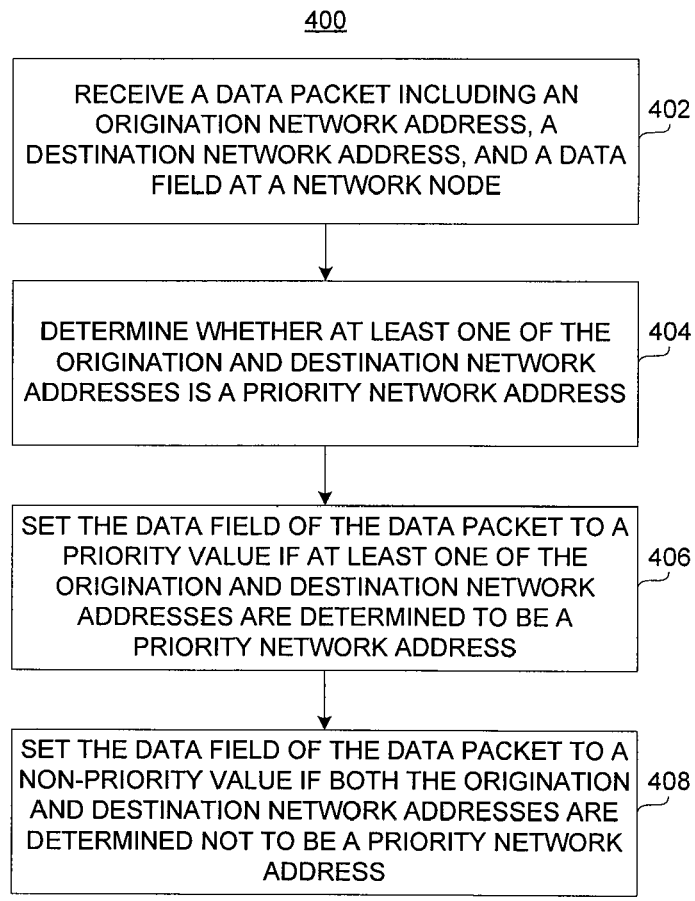
FIG. 4 is a flow chart of an exemplary process for prioritizing data packets being communicated over a packet network.

FIG. 4 is a flow chart of an exemplary process 400 for prioritizing data packets being communicated over a packet network. The process 400 may start at step 402, where a data packet is received at a network node. The network node may be at a network edge or any other network node. The data packet may include an origination network address, destination network address, and priority data field. At step 404, a determination may be made as to whether at least one of the origination and destination network addresses is a priority network address. In making the determination, the priority data field of the data packet may be set to a priority value if at least one of the origination and destination network addresses is determined to be a priority network address at step 406. The determination may be made based on a type of customer or subscriber that either the origination or destination network address is associated. For example, if the subscriber is a consumer subscriber, then the other network address may be checked to determine if is a network address that the customer has in his or her priority network address list. The priority data field of the data packet may be set to a non-priority value if both the origination and destination network addresses are determined not to be a priority network address at step 408. In one embodiment, the priority data field is a diffserv data field. In another embodiment, the priority data field is a p-bit data field. Alternatively, if one of the origination or destination network addresses is associated with a consumer customer, then if the other network is not included in the priority network address list associated with the network address of the consumer customer, then the priority data field may be set to a non-priority value. It should be understood that a variety of rules may be established to determine whether a priority value is to be set in the priority data field.

In one embodiment, the process may further include determining whether at least one of a sender and receiver of the data packet is associated with a priority network address and has priority credit available for communicating the data packet. In response to determining that at least one of the sender and receiver of the data packet is associated with a priority network address and has priority credit available for communicating the data packet, the data packet may be communicated in a prioritized manner. In communicating the data packet in a prioritized manner, the data packet may be routed without entering a queue or be routed along a priority data path.

Figure 5:
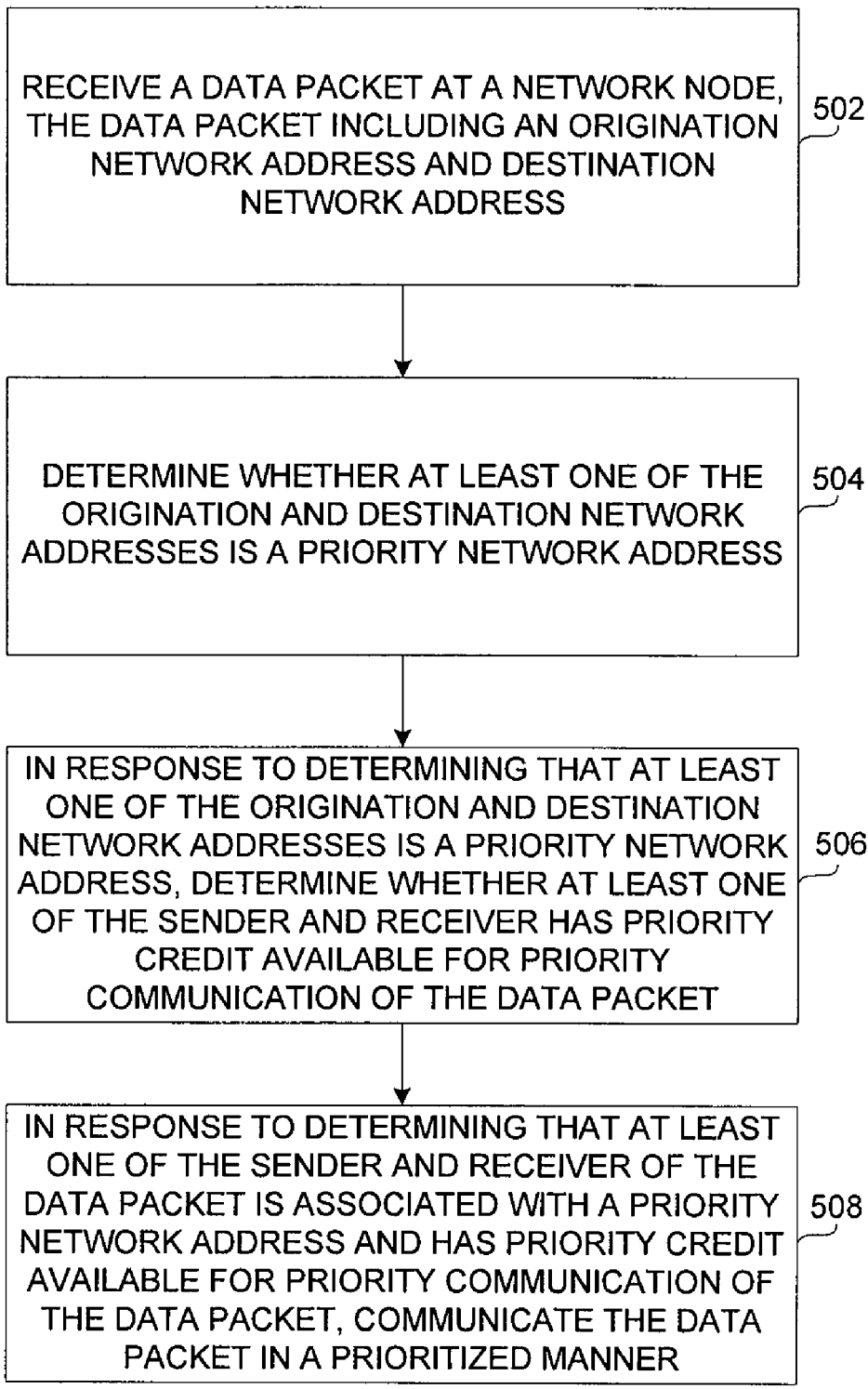
FIG. 5 is a flow chart of another process for prioritizing data packets being communicated over a packet network.

FIG. 5 is a flow chart of another process for prioritizing data packets being communicated over a packet network. The process 500 may include receiving a data packet at a network node at step 502. The data packet may include an origination network address and destination network address. At step 504, a determination as to whether at least one of the origination and destination network addresses is a priority network address. In response to determining that at least one of the origination and destination network addresses is a priority network address at step 504, a determination as to whether at least one of the sender and receiver has priority credit available for priority communication of the data packet may be made at step 506. In response to determining that at least one of the sender and receiver of the data packet is associated with a priority network address and has priority credit available for priority communication of the data packet, the data packet may be communicated in a prioritized manner at step 508.

FIG. 6 is a screen shot of an exemplary website 600 that enables a subscriber or network partner to identify priority network addresses. The website 600 may include a text entry field 602 to enable a subscriber or network partner to enter a domain name or IP address. Alternatively or additionally, a list of commonly accessed or advertised websites 604 that provide discount or free priority communications may be selectable. If a domain name is entered, the website 600 may communicate the domain name to a DNS to look up a corresponding network address. A list 606 of domain names and corresponding IP addresses may be displayed to indicate that accessing these websites will provide priority data packet communications for a user. Each entry in the list 606 may be selectable to be deleted or be moved to another position within the list. New entries may be added by the user entering another domain name in the text entry field 602.

In establishing the network addresses for priority data packet communications, the subscriber may establish his or her network address associated with a computer, customer premise equipment, commercial local area network (LAN), or otherwise. For example, a subscriber operating an Intranet may establish a priority network address for a network node, such as a server, that operates the Intranet. In another example, a commercial customer may identify a server that hosts a remote network access portal for telecommuting employees to access an employer's network during business hours. The list 606 of network addresses may be accessed to determine whether the customer desires to have priority services when the customer communicates with another network node. For example, a customer may set-up and receive priority services when communicating with a gaming website. In an alternative embodiment, an application service provider, such as a video download website (e.g., NetFlix®), may set-up priority for all customers that access their website to download movies, videos, or music. In another embodiment, the application service provider may establish times of day, such as off-peak times to encourage alternative time usages, at which time priority communications will be provided to members who access and utilize a website of the application service provider.

In addition to establishing network nodes for priority data packet communication services, the website 600 may include a data entry field 608 for entering or selecting a number of credits to receive for a time period (e.g., a month). An associated cost field 610 for the selected number of credits may be provided to enable the user to view cost for the entered number of minutes prior to purchasing the upgraded priority service. The data entry field 608 may be a text entry field, radio button beside different credit values (in minutes or other credit unit), or any other graphical user interface element for selecting or entering a time period, as understood in the art. The entered priority credits may be stored in the same or different database that stores the priority network addresses. In one embodiment, different levels of priority may be available for purchase, where a level I is provided less priority than a level IV. However, because both levels of priority service may be guaranteed, the different priority levels may simply mean that different communication paths are taken or different bandwidth is given to the different priority levels. A current balance listing 610 may also be displayed to enable a user to know current balance. If the user is a network partner, the current balance may show a differential balance between the network partner and service provider. The current balance listing 610 is shown as a time balance, but other units of measure may be utilized, such as total number of data bits or packets (e.g., 500 MB).

In one embodiment, a particular service provider resets the diffserv field or similar priority field of some or all packets that enter the network of the service provider in accordance with the principals of the present invention. For example, logic such as software 304 of FIG. 3 may be disposed at an edge node of the service provider and reset the diffserv or other priority field based on a determination of a priority network address, the availability of a priority credit to a particular subscriber of network services or host of a website, or any other factors to determine priority. Thereafter, at other nodes of the service provider, the diffserv or other priority field of such packet will not be ignored and will instead to be used to establish priority scheduling, queuing, switching, and routing of such packet. Importantly, in one embodiment, the owner or host of a particular website may pay a service provider to always prioritize any packets that are directed to or from a network address of the website. In an alternative embodiment, the owner or host of a particular website or web content may pay a service provider to always prioritize any packets that are directed to or from a network address of the website for particular customers of such owner or host, such as, for example, paid subscribers of the website. Thus, software 304 or similar logic may perform two different checks to determine priority, and only prioritize a packet, for example, where a destination IP address is associated with a website or content host or owner that has paid the service provider and where the origination IP address is associated with a subscriber who has paid the website or content host or owner.

The above description has been presented for purposes of illustration and description, and is not intended to be exhaustive or limited to the illustrative embodiments in the form disclosed. Many modifications and variations will be apparent to those of ordinary skill in the art.

What is claimed:

1. A method for prioritizing data packets being communicated over a packet network, said method comprising:
   receiving a data packet at a network node, the data packet including an origination network address, a destination network address, and a data field, wherein the data field of the received data packet is set to a priority value to indicate that the data packet is to receive priority transmission;
   determining whether at least one of the origination and destination network addresses is a priority network address by querying a remote networked database containing priority network addresses;
   keeping the data field of the received data packet set to the priority value if at least one of the origination and destination network addresses is determined to be a priority network address; and
   changing the data field of the data packet to a non-priority value if both the origination and destination network addresses are determined not to be a priority network address.

2. The method according to claim 1, further comprising:
   determining whether at least one of a sender and receiver of the data packet is associated with a priority network address and has priority credit available for communicating the data packet; and
   in response to determining that at least one of the sender and receiver of the data packet is associated with a priority network address and has priority credit available for communicating the data packet, communicating the data packet in a prioritized manner.

3. The method according to claim 1, further comprising:
   providing a graphical user interface for a user to enter a network address to be a priority network address; and
   communicating the user entered network address to the database for storage.

4. The system according to claim 1, wherein determining whether at least one of the origination and destination network addresses includes determining whether both of the origination and destination addresses are priority network addresses.

5. The method according to claim 1, wherein setting a data field includes setting a diffserv data field.

6. The method according to claim 1, further comprising:
 determining that the data field of the data packet is set to a priority value; and
 communicating the data packet to the destination network address using prioritization.

7. The method according to claim 6, wherein communicating the data packet to the destination network address using prioritization includes routing the data packet over a priority communication path over the network.

8. A method for prioritizing data packets being communicated over a packet network, said method comprising:
 receiving a data packet at a network node, the data packet including a priority data field, an origination network address and destination network address, wherein the priority data field of the received data packet is set to a priority value to indicate that the data packet is to receive priority transmission;
 determining whether at least one of the origination and destination network addresses is a priority network address;
 in response to a determination that both the origination and destination network addresses is not a priority network address, changing the priority data field of the received data packet from the priority value to a non-priority value;
 in response to determining that at least one of the origination and destination network addresses is a priority network address, maintaining the setting of the priority data field and determining whether at least one of a sender and a receiver has priority credit available for priority communication of the data packet; and
 in response to determining that at least one of the sender and receiver of the data packet is associated with a priority network address and has priority credit available for priority communication of the data packet, communicating the data packet in a prioritized manner.

9. The method according to claim 8, wherein communicating the data packet in a prioritized manner includes routing the data packet over a higher speed communications path than data packets not determined to have at least one of the origination and destination network addresses being a priority network address are communicated.

10. The method according to claim 8, wherein determining whether at least one of the origination and destination network addresses is a priority network address includes looking up each of the network addresses in a database.

11. The method according to claim 10, further comprising establishing priority network addresses in the database by receiving priority network addresses from a user from at least one of the origination and destination location addresses via a website.

12. The method according to claim 8, further comprising:
 setting a data field of the data packet to a priority value in response to determining that at least one of the origination and destination network addresses is a priority network address; and
 setting the data field to a non-priority value in response to determining that neither of the origination and destination network addresses is a priority network address.

13. The method according to claim 8, further comprising reducing the priority credit in response to communicating the data packet in a priority manner.

14. A network node for prioritizing data packets being communicated over a packet network, said network node comprising:
 an input/output unit configured to communicate data packets over a packet network; and
 a processing unit configured to:
  receive a data packet including an origination network address, destination network address, and a data field, wherein the data field of the received data packet is set to a priority value to indicate that the data packet is to receive priority transmission;
  determine whether at least one of the origination network address and destination network addresses is a priority network address by querying a remote network database containing priority network addresses;
  maintain the data field of the received data packet set to the priority value if at least one of the origination and destination network addresses is determined to be a priority network address;
  change the data field of the received data packet to a non-priority value if both the origination and destination network addresses are determined not to be a priority network addresses; and
  communicate the data packet with the data field being set to a priority value or non-priority value via said I/O unit over the packet network to the destination network address.

15. The network node according to claim 14, wherein said processing unit is further configured to:
 determine whether at least one of a sender and receiver of the data packet is associated with a priority network address and has priority credit available for communicating the data packet; and
 in response to determining that at least one of the sender and receiver of the data packet is associated with a priority network address and has priority credit available for communicating the data packet, communicate the data packet in a prioritized manner.

16. The network node according to claim 14, wherein the data field is a diffserv data field.

17. The network node according to claim 14, wherein said processing unit is configured to communicate the data packet with the data field set to a priority value using prioritization.

18. The network node according to claim 14, wherein said processing unit is further configured to cause priority credit to be reduced in response to communicating the data packet in a prioritized manner.

* * * * *